US012806516B2

(12) United States Patent
LaCroix et al.

(10) Patent No.: US 12,806,516 B2
(45) Date of Patent: Nov. 24, 2026

(54) RACING SIMULATION USING VARIOUS INPUT/OUTPUT MODALITIES

(71) Applicant: LENOVO (SINGAPORE) PTE. LTD., Singapore (SG)

(72) Inventors: James LaCroix, Morrisville, NC (US); Axel Ramirez, Morrisville, NC (US); Russell S VanBlon, Morrisville, NC (US); Nicolas Allebrodt, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 404 days.

(21) Appl. No.: 18/458,105

(22) Filed: Aug. 29, 2023

(65) Prior Publication Data

US 2025/0073578 A1 Mar. 6, 2025

(51) Int. Cl.

| | |
|---|---|
| *A63F 13/285* | (2014.01) |
| *A63F 13/212* | (2014.01) |
| *A63F 13/213* | (2014.01) |
| *A63F 13/5375* | (2014.01) |
| *A63F 13/798* | (2014.01) |
| *A63F 13/803* | (2014.01) |

(52) U.S. Cl.

CPC .......... *A63F 13/285* (2014.09); *A63F 13/212* (2014.09); *A63F 13/213* (2014.09); *A63F 13/5375* (2014.09); *A63F 13/798* (2014.09); *A63F 13/803* (2014.09)

(58) Field of Classification Search

None

See application file for complete search history.

(56) References Cited

U.S. PATENT DOCUMENTS

| | | | |
|---|---|---|---|
| 5,868,573 | A | 2/1999 | Kerby et al. |
| 10,475,204 | B2 | 11/2019 | Wang et al. |
| 10,803,674 | B2 | 10/2020 | Kocharlakota et al. |
| 10,890,976 | B2 | 1/2021 | Welch |
| 10,994,216 | B2 | 5/2021 | Board |
| 12,528,021 | B2 | 1/2026 | Bailey |
| 2002/0169013 | A1 | 11/2002 | Serizawa et al. |
| 2006/0040239 | A1 | 2/2006 | Cummins et al. |

(Continued)

FOREIGN PATENT DOCUMENTS

WO 2019106363 A1 6/2019

OTHER PUBLICATIONS

Lacroix et al., "Dynamic Real-Time Wind Simulation for Virtual Racing", file history of related U.S. Appl. No. 18/908,583, filed Oct. 7, 2024. (1201-487).

Lacroix et al., "Racing Simulation Using Active Seatbelt Tensioner", file history of related U.S. Appl. No. 18/908,544, filed Oct. 7, 2024. (1201-486).

Lacroix et al., "Racing Simulation Using Force Feedback at Steering Wheel", file history of related U.S. Appl. No. 18/908,506, filed Oct. 7, 2024. (1201-485).

(Continued)

*Primary Examiner* — Peter J Iannuzzi

(74) *Attorney, Agent, or Firm* — John M. Rogitz; John L. Rogitz

(57) ABSTRACT

In one aspect, a device includes a processor assembly and storage accessible to the processor assembly. The storage includes instructions executable by the processor assembly to facilitate a racing simulation. The instructions are also executable to, as part of facilitating the racing simulation, provide one or more outputs related to the racing simulation based on biometric input associated with a user, provide force feedback at a steering wheel input device, control an output device to simulate wind, and/or control an electronic seat belt.

20 Claims, 7 Drawing Sheets

(56) References Cited

U.S. PATENT DOCUMENTS

| | | | |
|---|---|---|---|
| 2007/0149284 | A1 | 6/2007 | Plavetich et al. |
| 2008/0318681 | A1 | 12/2008 | Rofougaran et al. |
| 2012/0288831 | A1 | 11/2012 | Campion et al. |
| 2016/0009200 | A1 | 1/2016 | Katoh et al. |
| 2017/0266676 | A1 | 9/2017 | Fateh |
| 2018/0352282 | A1* | 12/2018 | Lin .................... H04N 21/4781 |
| 2021/0166576 | A1 | 6/2021 | Berghold-Markom |
| 2022/0047951 | A1* | 2/2022 | Mehdi ................... A63F 13/216 |
| 2022/0157190 | A1 | 5/2022 | Krause |
| 2024/0424396 | A1 | 12/2024 | Manuel et al. |
| 2025/0073578 | A1 | 3/2025 | LaCroix et al. |
| 2025/0131849 | A1 | 4/2025 | Todeschini et al. |
| 2025/0246092 | A1 | 7/2025 | Jones |

OTHER PUBLICATIONS

Popa, Bogdan, "Mercedes Exploring a Waze-Like Warning System for Traffic Hazards", Jul. 10, 2023, retrieved from https://www.autoevolution.com/news/mercedes-exploring-a-waze-like-warning-system-for-traffic-hazards-217834.html.

LaCroix et al., "Dynamic Real-Time Wind Simulation for Virtual Racing", related U.S. Appl. No. 18/908,583 Non-Final Office Action dated May 20, 2026.

LaCroix et al., "Racing Simulation Using Active Seatbelt Tensioner", related U.S. Appl. No. 18/908,544, Non-Final Office Action dated May 13, 2026.

LaCroix et al., "Racing Simulation Using Force Feedback At Steering Wheel", related U.S. Appl. No. 18/908,506, Non-Final Office Action dated May 8, 2026.

* cited by examiner

RACING SIMULATION USING VARIOUS INPUT/OUTPUT MODALITIES

FIELD

The disclosure below relates to technically inventive, non-routine solutions that are necessarily rooted in computer technology and that produce concrete technical improvements. In particular, the disclosure below relates to improved racing simulations using various input/output modalities.

BACKGROUND

As recognized herein, current input and output modalities related to computer simulations are limited and can be improved.

SUMMARY

Accordingly, in one aspect a first device includes a processor assembly and storage accessible to the processor assembly. The storage includes instructions executable by the processor assembly to facilitate a racing simulation, receive biometric input associated with a user, and provide one or more outputs related to the racing simulation based on the biometric input.

Thus, in certain example implementations the biometric input may be related to gaze location. Here, based on identification of the gaze location using the biometric input, the instructions may be executable to identify one or more elements of a graphical user interface (GUI) presented at the gaze location as part of the racing simulation and to, based on the identification, enlarge the one or more elements as presented on the GUI.

Also in some example implementations, the instructions may be executable to estimate a level of confidence in the user based on the biometric input, where the level of confidence may be related to playing the racing simulation. So, for example, the level of confidence may relate to racing against another driver in the racing simulation, where the other driver may be a non-player driver controlled by the first device. Additionally, the biometric input may relate to heart rate, oxygen level, pupil dilation, and/or body temperature.

Additionally, in some examples the instructions may be executable to, based on the biometric input, create a highlight reel of the racing simulation. Here too the biometric input may relate to heart rate, oxygen level, pupil dilation, and/or body temperature.

What's more, if desired the instructions may be executable to, based on the biometric input, present one or more outputs to the user. The one or more outputs may indicate how the user can improve the user's performance in playing the racing simulation.

Still further, in some cases the instructions may be executable to, as part of facilitating the racing simulation, provide force feedback at a steering wheel input device.

Additionally or alternatively, as part of facilitating the racing simulation, the instructions may be executable to control an output device to simulate wind. The output device may include a fan, and the first device may even include the fan itself. In some specific examples, the instructions may be executable to, as part of facilitating the racing simulation, control the output device to simulate wind that is proportional to a speed of a virtual race car being controlled by the user as part of the racing simulation.

Still further, as part of facilitating the racing simulation, the instructions may also be executable to control an electronic seat belt. So, for example, the instructions may be executable to control the electronic seat belt to tighten at a first seat belt anchor point. In certain specific examples, the first device may even include the electronic seat belt.

In various examples, the first device may include an electronic headset on which visual content related to the racing simulation is presented, and/or may include an electronic race car in which the user can sit while playing the racing simulation.

In another aspect, a method includes facilitating a racing simulation at a device. The method also includes, as part of facilitating the racing simulation, providing one or more outputs related to the racing simulation based on biometric input associated with a user, providing force feedback at a steering wheel input device, controlling an output device to simulate wind, and/or controlling an electronic seat belt.

In still another aspect, at least one computer readable storage medium (CRSM) that is not a transitory signal includes instructions executable by a processor assembly to facilitate a racing simulation. The instructions are also executable to, as part of facilitating the racing simulation, provide one or more outputs related to the racing simulation based on biometric input associated with a user, provide force feedback at a steering wheel input device, control an output device to simulate wind, and/or control an electronic seat belt.

The details of present principles, both as to their structure and operation, can best be understood in reference to the accompanying drawings, in which like reference numerals refer to like parts, and in which:

DETAILED DESCRIPTION

Figure 1:
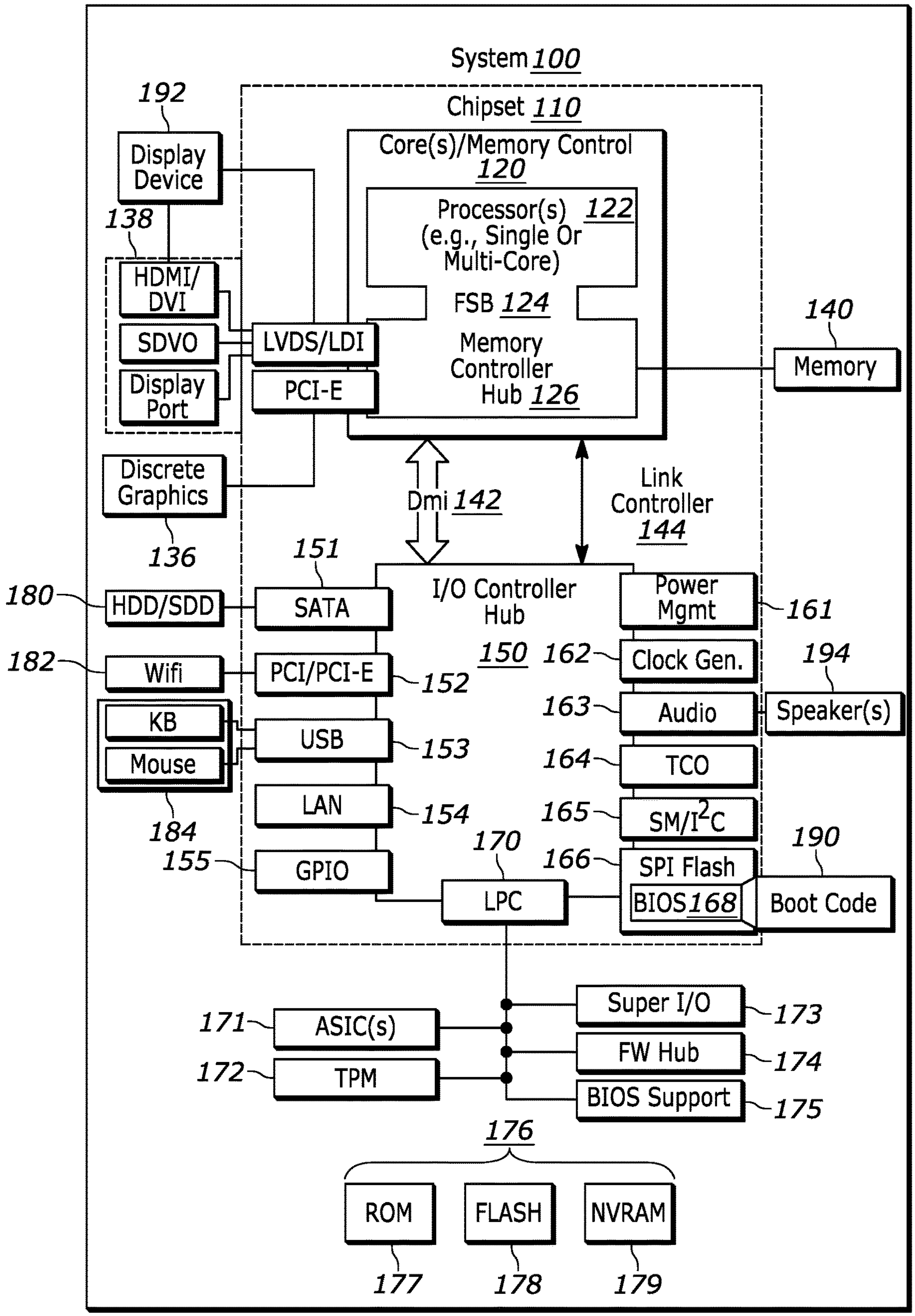
FIG. 1 is a block diagram of an example system consistent with present principles.

Among other things, the detailed description below describes devices and methods that connect racer telemetry, racer biometrics and sensors data to provide a next generation AR/VR racing simulation experience. Thus, a cutting-edge, no-latency AR/VR racing simulation experience is provided with the use of sensors fused with racer biometrics data using artificial intelligence and/or deep learning. In one specific example, a convolutional neural network (CNN) and deep learning algorithm/deep learning approach may be used for multimodal biometric and sensor recognition.

Sensors that may be involved include hydraulic pedals, direct drive steering (e.g., up to 32 NM of force on the wheel), push/pull actuators, surge actuators, traction loss, vitals biometric sensor(s) on the wrist, camera(s) for eye tracking inside the virtual headset, and microphones for voice control.

The user may thus feel every turn with the direct drive force feedback, providing unparalleled realism to the user's steering.

Motion controls may also be used, with a tactical and haptic feedback system fused with racer biometrics data using AI/deep learning.

Additionally, race control real-time telemetry may be fused with racer biometrics data, voice commands, and eye positioning.

Gauge controls and dashboards may show information (e.g., RPM, gear, fuel, lap count, position, speed, time per lap, weather, in/outside temperature) that ties with racer biometrics and eye positioning data to understand during the race what information is more important and grow the user interface (e.g., the fuel gauge may grow in size when racer is eying it because fuel is too low).

A race against a coach/ghost feature may also be provided. So the user might race against a real-life coach helping the user, or a "ghost" that is the user's best past lap/time on the same race course or the best lap/time of the best racer of record. Biometrics information may be used to predict with AI/deep learning and estimate confidence levels of the racer when driving against the "ghost" racer or real racer. This can provide insights for the user to improve their state of mind for future races.

Additionally, the user may revisit the most exciting moments of his/her race.

Human real-time vitals monitoring may be used consistent with present principles (e.g., heart rate, oxygen levels, time stamp recording, speed synching, pupil dilation, body temperature).

Additionally, biometric metadata may be tagged into these sessions for later analysis to be considered for improvement.

Still further, real-time wind simulation may be used and sync with the user's virtual racecar speed. Speed-dependent wind simulation may thus be fused with racer biometrics data to force a rush, using intensity to accelerate the user's heart rate and draw certain emotions.

Laser-scanned real-life race tracks and sensors map may also be used to create the virtual race courses, providing a highly authentic racing experience.

Additionally, a 5-point active belt tensioner may be used to build and simulate body pressure as the user speeds up, slows down, turns, etc.

Furthermore, real-life racing scenarios on a real-life racetrack using a real-life racecar are also envisioned, providing an advanced warning system in automobiles using peer-to-peer meshed inputs. Thus, in one aspect biometrics may be used to correlate with recent or real-time objects, scenarios, and conditions to identify items of interest. These items of interest may be later tied back to items and conditions to assist people (e.g., driver) in correcting or improving their performance during a previous session, race, etc. Biometrics may also be used real-time to assist others in a scenario (e.g., race) to know real-life objects and real-life items that are higher priority than others in a remote operation, simulation, etc. Still further, real-life road haptic input (e.g., as detected by a gyroscope and/or accelerometer) may be used to identify places in the real-life road/racetrack which may not have objects, but that do have or cause vibration, dips, holes, etc. Extreme biometrics may then be used to share with others to identify high vs low priority conditions, objects, etc.

What's more, biometric events may be translated digitally to identify them using cameras plus biometrics.

Additionally, the system may parse each real-life object/event and identify low risk vs high risk items steering turns, which could then feed back into the system to help filter out (or in) things that really matter for the given circumstances. In some cases, smart devices consistent with present principles may also be used to gather more data such as accelerometer/gyroscope or other sensors to be fused into the system to determine conditions or objects of interest, as well as those which can likely be ignored.

Still further, another person, such as a coach, could participate remotely/virtually to help the user identify real-life risks within a threshold which the racer may not be able to clearly identify as relevant or not (e.g., correct speed and turns).

The user may also revisit the most exciting moments of his/her race via a real-life highlight reel.

Deep learning may be used to generate detailed images conditioned on race highlights and or text search prompts. For example, a racer asks to see a video comparison of the coach's and the last racer's lap in video image-to-image side by side.

Present principles may thus be applied to gaming simulations and other fields.

Thus, interconnection of multiple real-time devices (e.g., cameras vehicles) may be used to identify hazards and traffic jams and immediately communicate info real-time to other real-life devices/vehicles for safety and decision making. Examples may include obstacles, objects in the road, people, pets, local conditions such as wet spots, etc. Road location may be tracked via GPS. Additionally, areas or regions that are not covered or "seen" by devices in the general real-life location (e.g., vehicles) may be covered and coverage augmented by stationary devices which are trained for items and conditions described above, thus connecting stationary cameras with mobile cameras and sensors for real-time real-life race feedback. Accordingly, camera infrastructure on vehicles and on roadways may be used to provide vantage points, and AI computing may provide view, tracking and insights not necessarily possible by humans. Thus, improvements are proposed for real-item identification and content creation of images that provide insights and improve navigation at faster speeds than humanly possible.

As mentioned above, use cases include not just gaming but training, educational (e.g., totally virtual), deliveries, simulations of real life activities, etc. (part real life, part virtual).

Present principles may therefore employ machine learning models, including deep learning models. Machine learning models use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), recurrent neural network (RNN) which may be appropriate to learn information from a series of images, and a type of RNN known as a long short-term memory (LSTM) network. Support vector machines (SVM) and Bayesian networks also may be considered to be examples of machine learning models.

As understood herein, performing machine learning involves accessing and then training a model on training data to enable the model to process further data to make predictions. A neural network may include an input layer, an output layer, and multiple hidden layers in between that are configured and weighted to make inferences about an appropriate output.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used, as may a Chrome or Android or Windows or macOS operating system. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in the art. Where employed, the software instructions may also be embodied in a non-transitory device that is being vended and/or provided, and that is not a transitory, propagating signal and/or a signal per se. For instance, the non-transitory device may be or include a hard disk drive, solid state drive, or CD ROM. Flash drives may also be used for storing the instructions. Additionally, the software code instructions may also be downloaded over the Internet (e.g., as part of an application ("app") or software file). Accordingly, it is to be understood that although a software application for undertaking present principles may be vended with a device such as the system 100 described below, such an application may also be downloaded from a server to a device over a network such as the Internet. An application can also run on a server and associated presentations may be displayed through a browser (and/or through a dedicated companion app) on a client device in communication with the server.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a hard disk drive (HDD) or solid state drive (SSD), a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 includes a processor assembly 122 (e.g., one or more single core or multi-core processors, etc.) and a memory controller hub 126 that exchange information via a front side bus (FSB) 124. A processor assembly such as the assembly 122 may therefore include one or more processors acting independently or in concert with each other to execute an algorithm, whether those processors are in one device or more than one device. Additionally, as described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one or more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 and/or PCI-E interface 152 provide for reading, writing or reading and writing information on one or more drives 180 such as HDDs, SSDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor assembly 122, an accelerometer that senses acceleration and/or movement of the system 100 and provides related input to the processor assembly 122, and/or a magnetometer that senses and/or measures directional movement of the system 100 and provides related input to the processor assembly 122.

Still further, the system 100 may include an audio receiver/microphone that provides input from the microphone to the processor assembly 122 based on audio that is detected, such as via a user providing audible input to the microphone. The system 100 may also include a camera that gathers one or more images and provides the images and related input (e.g., metadata like an image timestamp) to the processor assembly 122. The camera may be a thermal imaging camera, an infrared (IR) camera, a digital camera such as a webcam, a three-dimensional (3D) camera, and/or a camera otherwise integrated into the system 100 and controllable by the processor assembly 122 to gather still images and/or video.

Also, the system 100 may include a global positioning system (GPS) transceiver that is configured to communicate with satellites to receive/identify geographic position information and provide the geographic position information to the processor assembly 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
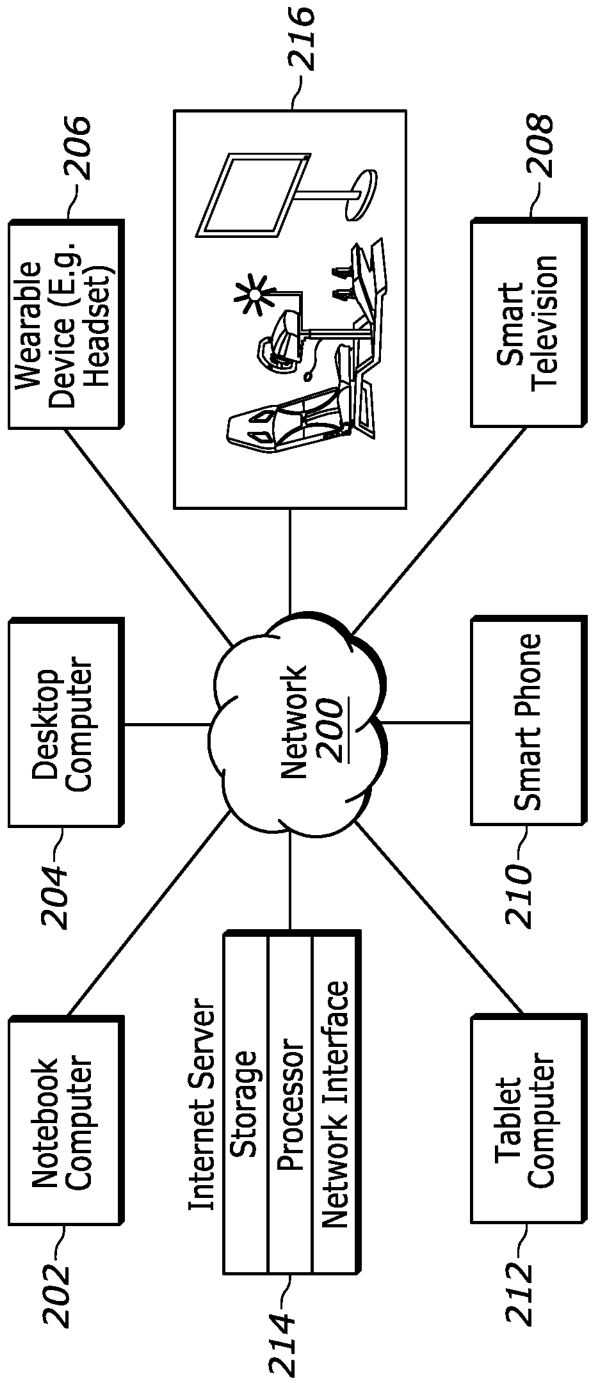
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch or XR headset, a smart television (TV) 208, a smart phone 210, a tablet computer 212, an electronic race car 216 in which a user can sit while playing a racing simulation, and a server 214 such as an Internet server that may provide cloud storage accessible to the devices 202-212, 216. It is to be understood that the devices 202-216 may be configured to communicate with each other over the network 200 to undertake present principles.

Figure 3:
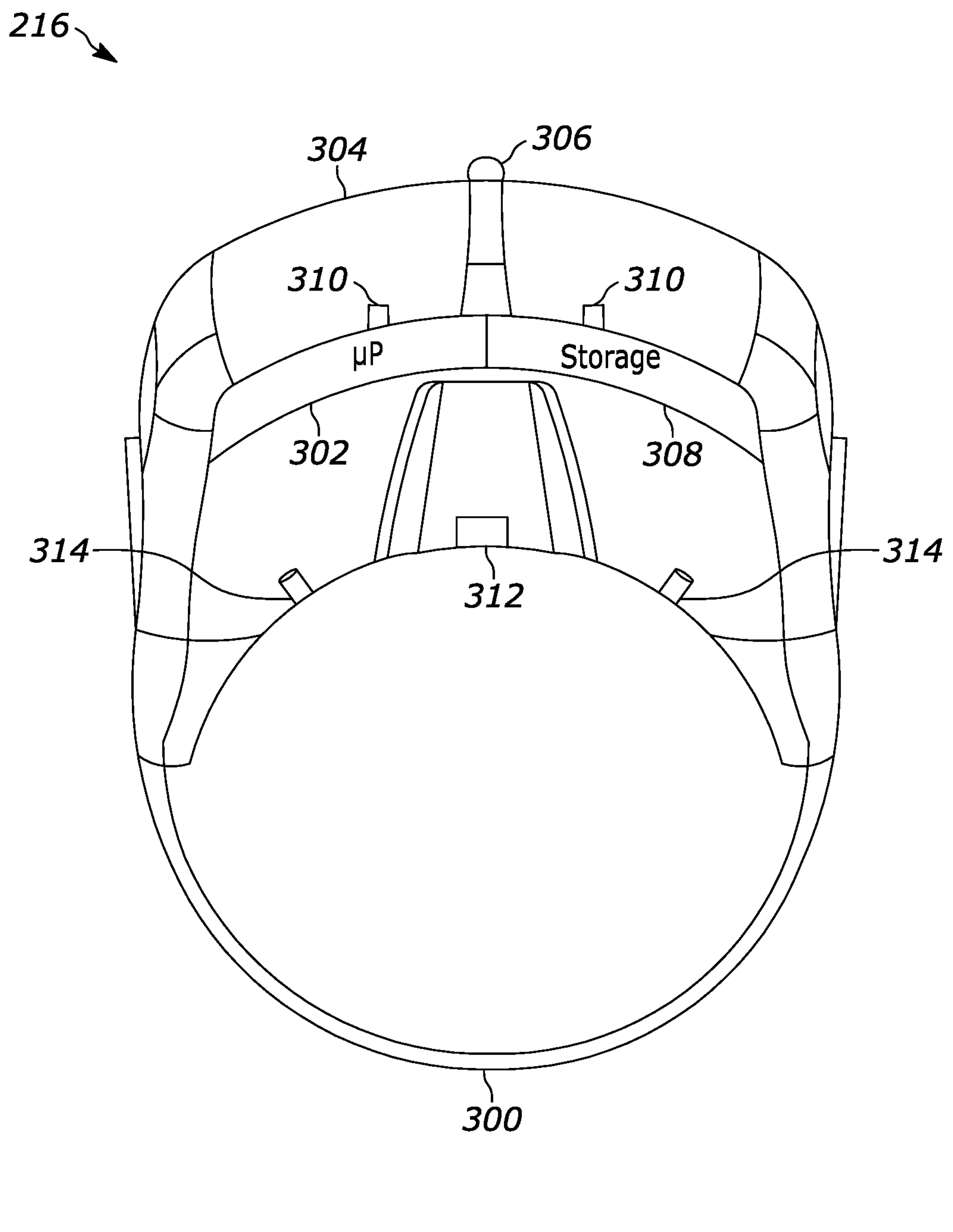
FIG. 3 is a block diagram of an example extended reality (XR) headset consistent with present principles.

Now describing FIG. 3, it shows a top plan view of a headset such as the headset 206 consistent with present principles. The headset 206 may be used to present audio and/or video of the racing simulation at the headset's speakers and display while other input/output is provided via the electronic race car 216.

The headset 206 may include a housing 300, at least one processor assembly 302 in the housing 300, and a non-transparent or transparent "heads up" display 304 accessible to the at least one processor assembly 302 and coupled to the housing 300. The display 304 may for example have discrete left and right eye pieces as shown for presentation of stereoscopic images and/or 3D virtual images/objects using augmented reality (AR) software, virtual reality (VR) software, and/or mixed reality (MR) software (more generally, extended reality (XR) software). The display 304 may thus present visual content related to the racing simulation.

The headset 206 may also include one or more forward-facing cameras 306. As shown, the camera 306 may be mounted on a bridge portion of the display 304 above where the user's nose would be so that it may have an outward-facing field of view similar to that of the user himself or herself while wearing the headset 206. The camera 306 may be used for computer vision, image registration, spatial mapping, etc. to identify biometrics and other data as described herein and/or to track user movements within real-world space. However, further note that the camera(s) 306 may be located at other headset locations as well. Further note that in some examples, inward-facing cameras 310 may also be mounted within the headset 206 and oriented to image the user's eyes for eye tracking while the user wears the headset 206 consistent with present principles.

Additionally, the headset 206 may include storage 308 accessible to the processor assembly 302 and coupled to the housing 300, a microphone 312 for detecting audio of the user speaking to provide voice commands to the racing simulation and detecting audio biometric data consistent with present principles (e.g., detecting excitement in the user's voice). The headset 206 may include additional biometric sensors 314 as well, such as a heart rate sensor, an oxygen level sensor, and/or a body temperature sensor.

The headset 206 may include still other components not shown for simplicity, such as a network interface for communicating over a network such as the Internet and a battery for powering components of the headset 206 such as the camera(s) 306. The headset 206 may also include one or more speakers for presenting audio of the racing simulation. Additionally, note that while the headset 206 is illustrated as a head-circumscribing VR headset, it may also be established by computerized smart glasses or another type of headset including other types of AR and MR headsets. For example, the headset may be established by an AR headset that may have a transparent display that is able to present 3D virtual objects/content.

As mentioned above, the headset 206 may also communicate with the electronic race car 216 and/or a remotely-located server such as the server 214 to execute/facilitate a racing simulation consistent with present principles. The race car 216 is shown in greater detail in FIG. 4. As shown in this figure, the race car 216 may include a seat 400 in which a user can sit. The electronic race car may also include an electronic gas pedal 405 and an electronic brake pedal 410, either of which may be pushed forwards and released backwards by the user using his/her foot to either accelerate or decelerate/brake a virtual vehicle being controlled by the user as part of the racing simulation (via control of the real-life electronic pedals 405, 410). The pedals 405, 410 may thus include one or more sensors such as infrared (IR) proximity sensors, potentiometers, pressure sensors, position sensors, etc. to sense movement of the pedals 405, 410 to thus provide associated input to the racing simulation.

Figure 4:
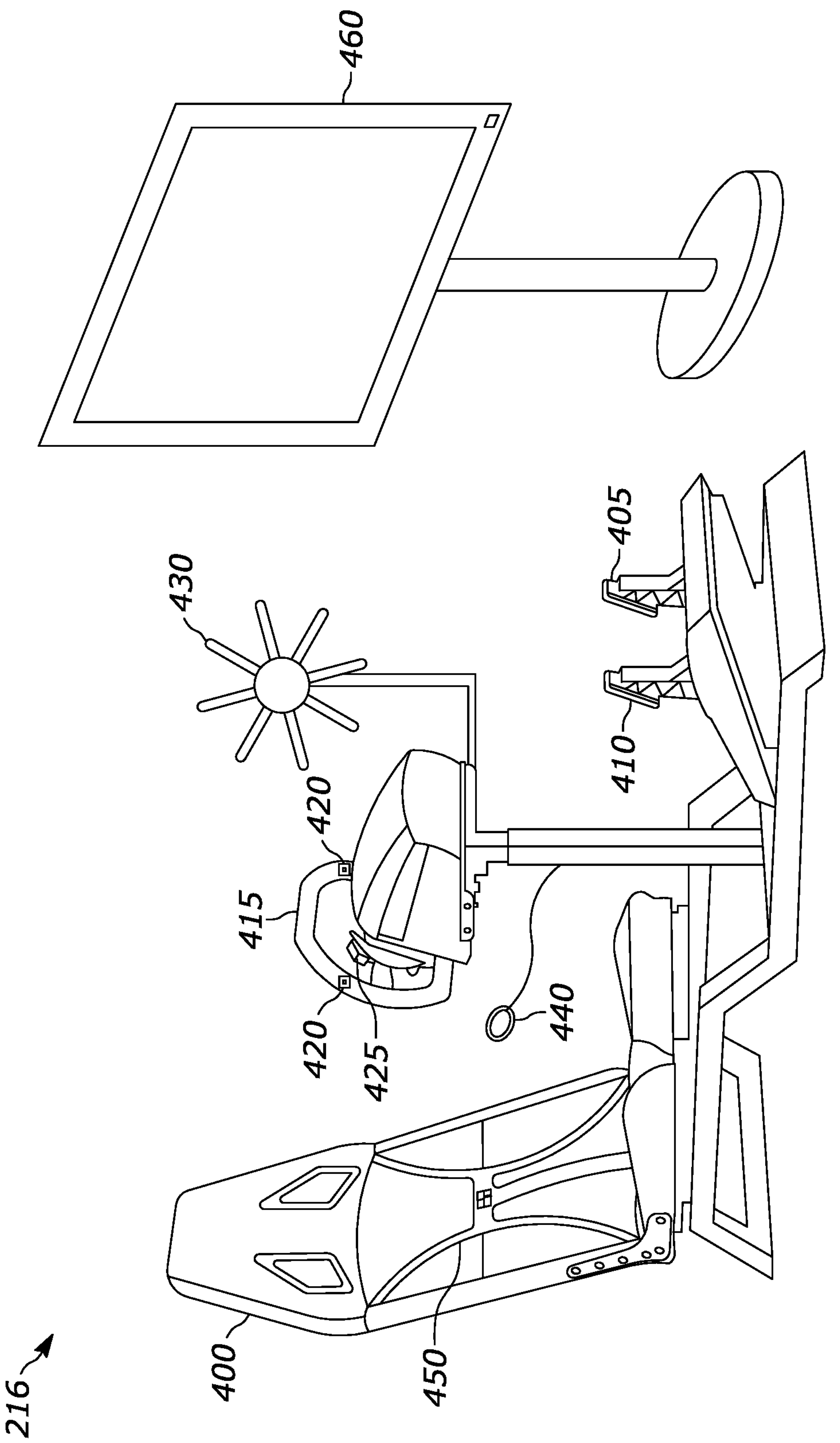
FIG. 4 is a perspective view illustration of an example electronic race car in which a user can sit while playing a racing simulation consistent with present principles.

As also shown in FIG. 4, an electronic steering wheel 415 may also be included on the device 216. The steering wheel may include one or more vibrators 420 at different locations on the steering wheel 415 to create haptic/force feedback consistent with present principles. Each vibrator 420 may be established by, for example, an electric motor connected to an off-center and/or off-balanced weight via the motor's rotatable shaft so that the shaft may rotate under control of the motor (which in turn may be controlled by a processor assembly such as the assembly 122) to create vibration of various frequencies and/or amplitudes as well as force simulations in various directions.

The steering wheel 415 may also include a potentiometer 425 or other type of sensor to sense turning of the steering wheel 415 while the user plays the racing simulation.

As also shown, the device 216 may include one or more electronic fans 430 including respective motors controllable by the device to increase and decrease the speed of the fans 420 to create wind proportional to a speed of a virtual race car being controlled by the user as part of the racing simulation to thus simulate wind that might be experienced by a real-life racer while racing. Other devices to similarly generate air flow may also be used.

The device 216 may further include a wired or wireless wearable device 440 that may be engaged with a user's wrist or other body part to sense one or more biometrics of the user. Thus, the device 440 may include a heart rate sensor, an oxygen level sensor, a body temperature sensor, and/or another type of sensor for providing biometric input to a system operating consistent with present principles.

As also shown in FIG. 4, the device 216 may include a five-point electronic seatbelt 450 that anchors to the seat 400 at five respective locations, such as above each shoulder, to the side of each hip, and in between the legs. Each anchor point of the seatbelt 450 may be coupled to a motorized spool that can extend and retract the respective belt segment for that anchor point consistent with present principles.

As also shown in FIG. 4, the device 216 may include a display 460 on which visual content may be presented. The visual content may include real-time video of the racing simulation as well as the GUIs described below. Note that the headset display may additionally or alternatively present the same content.

Figure 5:
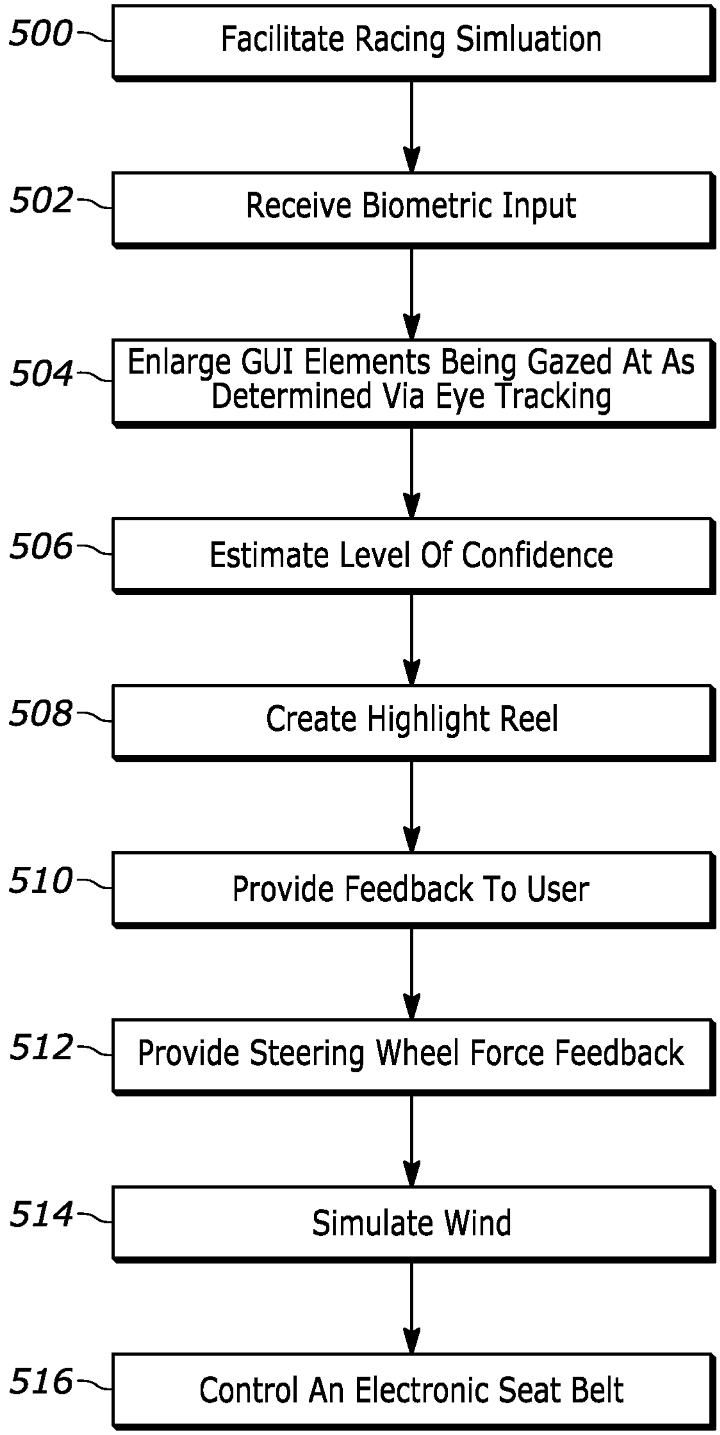
FIG. 5 illustrates example logic in example flow chart format that may be executed by a device consistent with present principles.

With FIGS. 1-4 having been described, it is to be understood that a user's experience in a vehicle racing simulation may be enhanced through several operations performed by a device/system, which may include a processor executing a set of codes to control functional elements of a real-life racing apparatus such as the e-vehicle 216. Accordingly and now referring now to FIG. 5, it shows example logic that may be executed by a device such as the system 100, headset 206, server 214, and/or electronic race car 216 alone or in any appropriate combination consistent with present principles. Note that while the logic of FIG. 5 is shown in flow chart format, other suitable logic may also be used.

Beginning at block 500, the device may facilitate a virtual racing simulation where the user races a virtual race car against other virtual race cars on a virtual race track. The other race cars might be controlled by other human players/users, and/or autonomously by the gaming system itself. From block 500 the logic may then proceed to block 502.

At block 502 the device may receive and process input from one or more biometric sensors, including any of those described herein (e.g., a camera, a microphone, a body temperature sensor, a heart rate sensor, etc.), to subsequently provide one or more outputs related to the racing simulation. The system may thus collect and analyze biometric data from the user using a convolutional neural network (CNN) and/or other type of artificial intelligence-based model, such as heart rate data, oxygen level data, pupil dilation data, and/or body temperature data. In particular, this data may include camera images of the user's eyes that can then be analyzed using eye tracking to, at block 504, identify a gaze location of a virtual vehicle dashboard graphical user interface (GUI) at which the user is looking to then identify and enlarge elements of the GUI at which the user is looking, making those elements more visible and easier to interact with.

The system may also estimate, at block 506, the user's level of confidence related to playing the racing simulation using the biometric input. The level of confidence may relate to racing against another driver in the racing simulation, whether that driver is a real-life human driver controlling another virtual race car or a non-player/virtual driver controlling another virtual race car. For block 506, the biometric input may thus relate to heart rate, oxygen level, pupil dilation, body temperature, etc. to thus determine whether a user is calm or excited/nervous, which would indicate high confidence (calm) or low confidence (excitement/nervousness). So, for example, the faster the heart rate or the higher the body temperature, the more nervous the user may be determined to be (e.g., along a preconfigured or dynamically-determiner nervousness scale).

Then at block 508, based on the received biometric input the device may create one or more video highlight reels showcasing the user's best and/or worst moments in playing the simulation. The highlight reels may therefore include video clips of different segments from the total simulation video showing the user's gameplay (e.g., as buffered in RAM and/or stored to persistent storage). Thus, here again heart rate, oxygen level, pupil dilation, and/or body temperature may be used to infer excitement or nervousness as discussed above, with periods of simulation video presented at the same time/duration as the excitement or nervousness being included in the highlight reel. Again a CNN may be used to do so.

Additionally, if desired the system may present additional outputs to the user at block 510 based on the biometric input, providing the user with feedback and suggestions to improve the user's performance in playing in the racing simulation. This might occur during the racing simulation or after the racing simulation has concluded.

From block 510 the logic may then proceed to block 512. At block 512 the device may, as part of facilitating the racing simulation, provide force feedback at a steering wheel input device. The device may do so using vibrators such as the vibrators 420 discussed above. The force feedback may simulate virtual holes or obstacles over which the user's virtual race car travels as part of the simulation, and/or may simulate a turn and the resulting gravitational force. Other haptic simulations are also envisioned.

After block 512 the device may proceed to block 514. At block 514 and as part of the racing simulation, the device may also control an output device such as the fan(s) 430 to simulate wind. Thus, at block 512 the device may control the fan to simulate wind that is proportional to a speed of a virtual race car being controlled by the user as part of the racing simulation (e.g., the virtual speed of the virtual race car being provided by the game engine executing the simulation). So, for example, if the virtual race car were virtually going fifty miles an hour in the simulation, the fan speed may be set to blow air in real life at a speed of fifty miles an hour.

After block 512 the logic may then proceed to block 514. At block 514 the device may, as part of facilitating the racing simulation, control an electronic seat belt such as the seat belt 450. The electronic seat belt may be controlled to tighten (retract) at one or more anchor points and/or to loosen (extend) at one or more anchor points. This may help give the user the sensation of being forced to one side of the real-life device 400 or the other based on G-force/centripetal force simulated in the racing simulation. So, for example, anchor points on the left side of the user may be tightened and anchor points of the right side of the user may be loosened to simulate centripetal force pushing the user to the left. Likewise, anchor points on the right side of the user may be tightened and anchor points of the left side of the user may be loosened to simulate centripetal force pushing the user to the right. Up/down forces may also be simulated using upper and lower anchor points, respectively. Vehicle acceleration forces may be simulated by loosening all belt straps via the anchor points (e.g., so the belt straps are not taut) while vehicle deceleration forces may be simulated by tightening all belt components straps via the anchor points (e.g., so the belt straps are taut).

In conjunction with FIG. 5, examples will now be provided of various types of biometric data that may be collected and analyzed in the process of enhancing a user's experience in a vehicle racing simulation. The biometric data may include heart rate data, skin conductivity data (e.g., to sense sweating and hence infer nervousness), eye tracking data, facial expression data (e.g. sensed using camera input and facial recognition), and body movement data.

As a specific example, heart rate data can provide insights into the user's level of excitement or stress, which can be used to adjust the difficulty level of the simulation, to provide targeted feedback, to include a video clip in a highlight reel, etc. Skin conductivity data can be used to gauge the user's level of engagement or excitement, which can be useful for purposes described herein. Eye tracking data can be analyzed to determine where the user's attention is focused, which can be used to highlight important elements on the graphical user interface (e.g., enlarge them) or to guide the user's gaze towards key areas of the screen. Facial expression data can be used to infer the user's emotional state, which can be used to tailor the user's experience to their mood or to provide emotional support when needed or to include certain video clips in a highlight reel. Body movement data (e.g. determined from camera input) can provide information about the user's physical reactions, which can be used to enhance the realism of the simulation or to provide feedback on the user's driving technique or to infer excitement/nervousness. Thus, these different types of biometric data can provide a comprehensive picture of the user's physiological and psychological state, which can be used to create a more immersive and personalized vehicle racing simulation experience consistent with present principles.

Additionally, as far as estimating the level of confidence in the user during the vehicle racing simulation, this process may involve the analysis of various types of biometric data (e.g., using a CNN). So, for example, the user's heart rate may be monitored and interpreted. This data can provide insights into the user's stress levels and overall emotional state during the simulation, where the higher the heart rate the more stressed the user might be. Skin conductivity may also be measured. This can be an indicator of the user's excitement (e.g., when the user is determined to be sweating), which can be linked to their level of engagement and/or can be used to include clips in a highlight reel.

Eye movements may also be tracked to provide information about the user's focus and attention during the simulation. Facial expressions may also be analyzed to give an indication of the user's emotional reactions to events in the simulation. Body movements may also be monitored to provide information about the user's physical reactions and overall performance in the simulation. This data as collected and analyzed (e.g., using a CNN) may be used to estimate the user's level of confidence in the simulation. This information can then be used to enhance the user's experience and performance in the vehicle racing simulation.

In terms of creating a highlight reel, this process may include a replay video of a successful maneuver performed by the user, a replay video of a mistake made by the user, and a replay video of a close call experienced by the user. This process may enhance the user's experience in the vehicle racing simulation by providing them with a comprehensive review of their performance. The successful maneuver replay video may serve to reinforce positive actions, while the mistake replay video and close call replay video may offer opportunities for learning and improvement.

As also mentioned above, various types of other feedback may be provided to users to enhance their experience in a vehicle racing simulation. This includes suggestions for improving the user's driving technique, enhancing reaction time, and refining strategic decision-making. These outputs may be generated based on the analysis of the user's biometric data and may provide personalized feedback to improve the user's performance in the simulation. The feedback may be presented in a user-friendly manner, making it easy for the users to understand and implement the suggestions.

Now in terms of additional details on providing steering wheel force feedback, one or more haptic feedback mechanisms such as the vibrators 420 may be used to deliver tactile sensations to the user in response to the user inputs and/or things that occur in the racing simulation. This too may help to create an immersive and interactive racing simulation experience for the user. Thus, various user inputs such as turning to the left or right by a higher number of degrees or lesser number of degrees may result in more or less force feedback, respectively, being provided to the user. Therefore, different intensities of force feedback may be delivered in response to the amount of user input/turning and other things that occur in the racing simulation. For example, all vibrators on the steering wheel may vibrate intensely responsive to a virtual crash of the user's virtual vehicle into a virtual wall, another virtual racecar, or other virtual object. As another example, all or some vibrators may vibrate with less force responsive to virtual loss of traction, virtual drifting, and/or a virtual fishtail maneuver.

Now getting more specific in terms of simulating wind consistent with present principles, note that wind conditions may be mimicked according to the wind that might be felt during a real-life auto race (e.g., in a convertible vehicle or when the windows are down). This may be accomplished by controlling a fan or other output device based on the virtual speed of the user's virtual vehicle in the simulation, creating a dynamic and immersive racing experience. Additionally, wind simulation may vary based on different racing scenarios.

Still further, the device may simulate wind conditions based on virtual weather data. This may be achieved by configuring the device for simulating wind conditions to mimic real-world wind conditions based on virtual weather data provided by the game engine (e.g., in addition to simulating the wind that would be generated based on virtual vehicle speed alone).

The operation and control of the fan or other air movement device may thus be influenced by various factors, including the virtual speed of the vehicle in the simulation, user inputs, and even virtual weather data. Additionally, the fan or fans may even rotate about the user, or different fans directed at the user from different directions may be used, to simulate not just wind speed but wind from a particular direction according to the virtual weather conditions, which may affect the virtual vehicle's performance and the user's strategy during the simulation since the virtual weather conditions (e.g., virtual climate wind) might push the virtual race car one way or the other on the virtual race track. Additionally, wind from a turn may be simulated. So if a user turns to the right in the simulation, the wind may come at the user from the user's right/front right, whereas if the user turns to the left in the simulation then the wind may come from the user's left/front left.

Turning to electronic seatbelt tension adjustments, an electronic five-point seatbelt assembly (or even two or three-point seatbelt assembly) may be adjusted in real-time during playout of the racing simulation using one or more of the five-point seatbelt tensioners (e.g., the motor/reel combinations disclosed above). In some specific examples, the tension adjustment may be based on the speed and direction of the user's virtual vehicle within the simulation, the position of the vehicle, the type of virtual vehicle, the terrain underneath and around the vehicle, acceleration and deceleration of the virtual vehicle, and virtual weather conditions, thus providing a realistic racing experience for the user and increasing the authenticity of the experience.

Specifically in terms of terrain, it might include various types of landscapes such as hills, valleys, potholes, and flat surfaces, each of which would have a different impact on the forces experienced by the user. The seat belt mechanism may adjust the tension of the seatbelt accordingly to simulate these forces.

Figure 6:
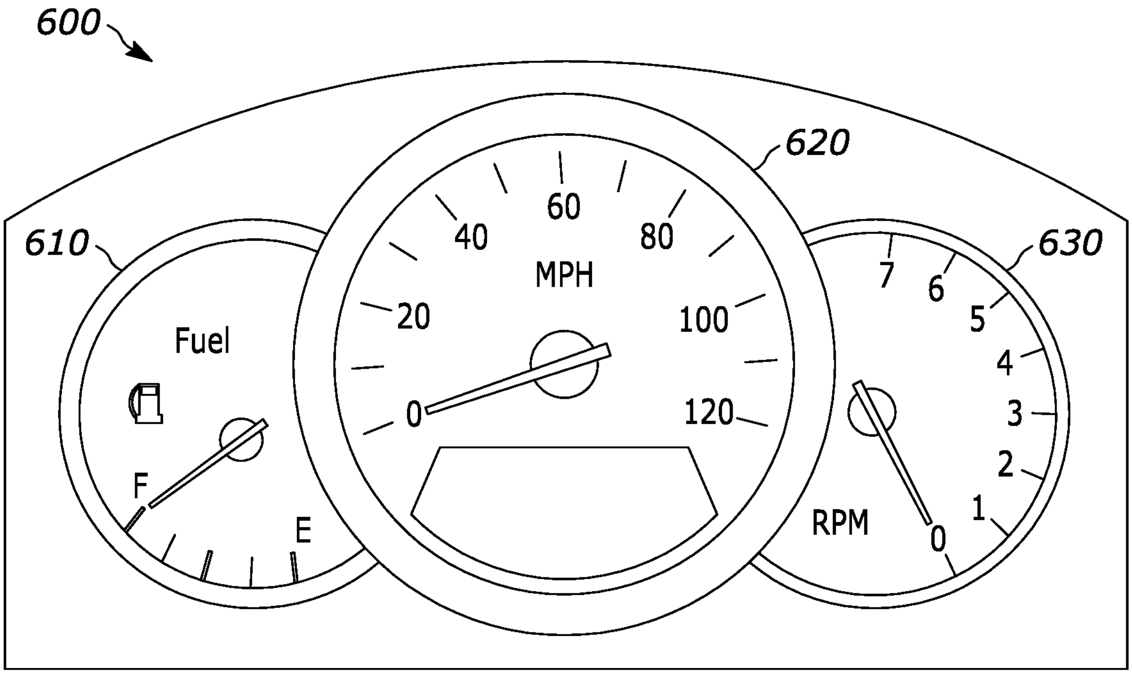
FIGS. 6 and 7 show various example graphical user interfaces (GUIs) with racing gauges that may be expanded or reduced based on user gaze location consistent with present principles.

Now describing FIG. 6, an example GUI 600 is shown that may be presented on a computer monitor, the display of an XR headset, or other display consistent with present principles. The GUI 600 may be a virtual gauge panel for the virtual race car being driven by a human driver during a racing simulation consistent with present principles. As shown in FIG. 6, the GUI 600 may include a fuel gauge 610, a speedometer 620, and a tachometer 630. And though not shown for simplicity, other gauges may be included on the GUI 600 as well, such as a gear gauge indicating the current/operative transmission gear being used, a lap counter, position gauge/race map, time per lap gauge, weather gauge, engine temperature gauge, and/or inside/outside temperature gauge.

Figure 7:
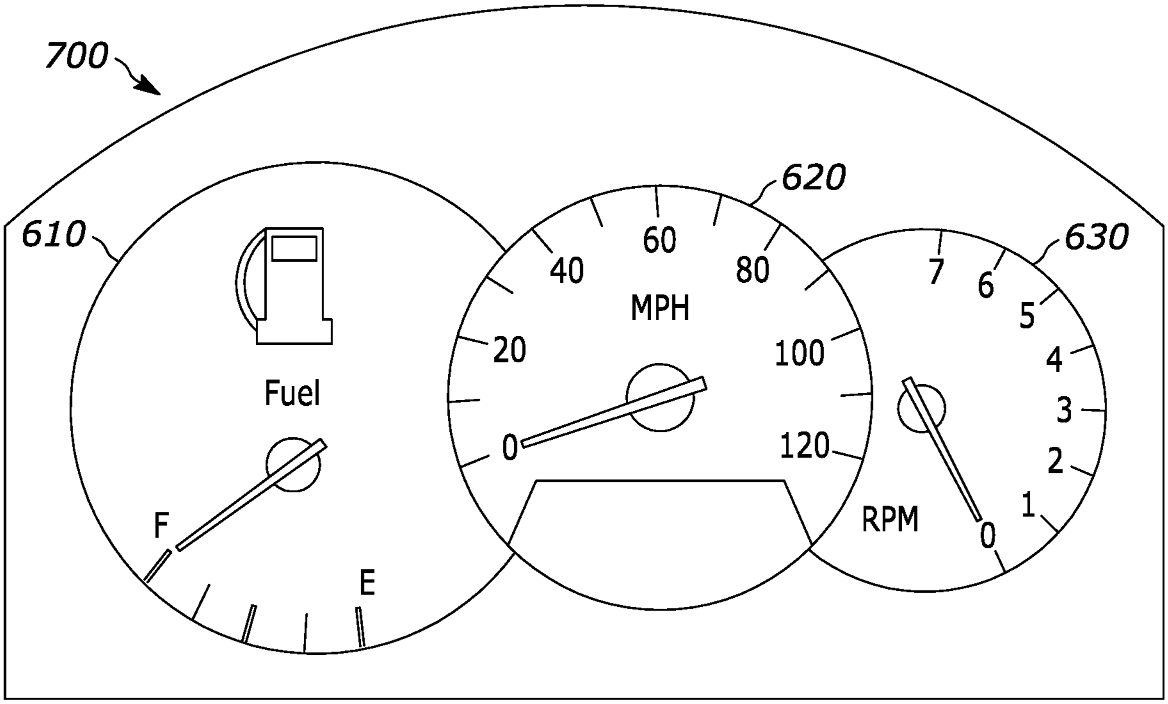

In any case, FIG. 6 demonstrates a default layout of the GUI 600. However, responsive to the device determining via eye tracking (e.g., using the outside-in cameras 310 of FIG. 3) that the user is gazing at the fuel gauge 610 for at least a threshold amount of time (such as one second, to avoid false positives), the GUI 600 of FIG. 6 may morph into the GUI 700 of FIG. 7. As shown in FIG. 7, the GUI 700 may include the same gauges 610-630, but the fuel gauge 610 has been enlarged in size responsive to the user looking at it while the gauges 620, 630 have been reduced in size responsive to the user looking at the fuel gauge 610.

Figure 8:
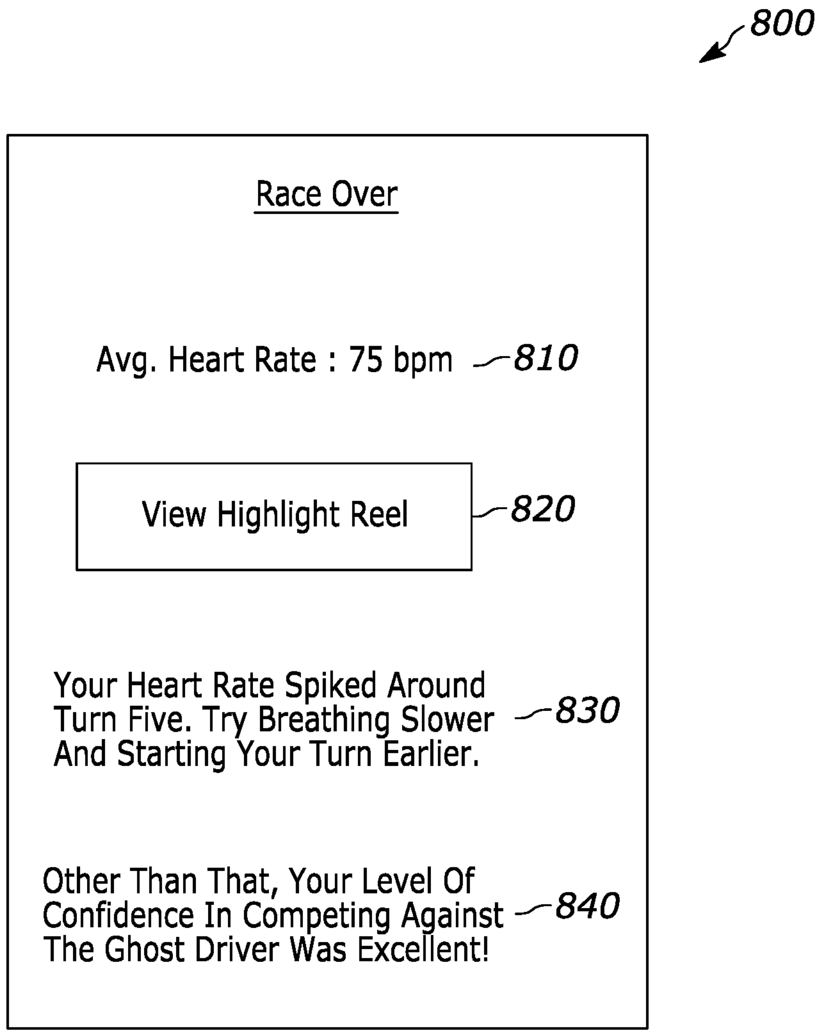
FIG. 8 shows an example GUI that may be presented responsive to a virtual race ending to provide the user with various outputs that the user might find helpful.

Turning now to FIG. 8, another example GUI 800 is shown. The GUI 800 may be presented on the same display as the GUIs 600/700, but responsive to a virtual racing simulation ending or even a pause command during the racing simulation. As shown, the GUI 800 may include biometric data 810, such as an average heart rate of the user during the simulation. Other averages for other biometrics discussed above may also be presented.

The GUI 800 may also include a selector 820. The selector 820 may be selected to begin playout of a highlight reel generated as discussed above.

As also shown in FIG. 8, the GUI 800 may also include an output 830 providing feedback to the user (e.g., as might be provided at block 510 above) based on the user's sensed biometrics. In the present instance, the output 830 indicates that the user's heart rate spiked around "Turn 5" of the virtual race course. The output 830 also includes a suggestion to help the user improve his/her performance around this turn, which in this case includes trying to breathe slower as well as starting the turn into Turn 5 sooner. These types of outputs might be provided by a CNN that has been trained to make inferences about suggestions to users based on training data of various biometrics and game state data (as training input) and ground truth suggestions (labeling the training input data).

If desired, the GUI 800 may include an additional output 840. The output 840 may relate to the user's determined level of confidence during the virtual race (e.g., as might be estimated and provided at block 506 above). In the current example, the output 840 indicates that the user's overall level of confidence against a ghost driver (e.g., non-human/non-player driver) was excellent. These types of outputs might be provided by a CNN that has been trained to make inferences about levels of confidence based on training data of various biometrics and game state data (as training input) and ground truth level of confidence outputs (labeling the training input data).

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:

a processor assembly; and storage accessible to the processor assembly and comprising instructions executable by the processor assembly to:

facilitate a racing simulation;

receive biometric input associated with a user; and based on the biometric input, provide one or more outputs related to the racing simulation;

wherein the instructions are executable to:

as part of facilitating the racing simulation, control an electronic seat belt;

wherein the instructions are executable to:

control the electronic seat belt to tighten at a first seat belt anchor point.

2. The first device of claim 1, wherein the biometric input relates to one or more of: heart rate, oxygen level, pupil dilation, body temperature.

3. The first device of claim 1, wherein the instructions are executable to:

as part of facilitating the racing simulation, provide force feedback at a steering wheel input device.

4. The first device of claim 1, comprising the electronic seat belt.

5. The first device of claim 1, comprising an electronic headset on which visual content related to the racing simulation is presented.

6. The first device of claim 1, comprising an electronic race car in which the user can sit while playing the racing simulation.

7. The first device of claim 1, wherein the instructions are executable to:

control the electronic seat belt to tighten at the first seat belt anchor point by retracting the seat belt at the first seat belt anchor point.

8. The first device of claim 7, wherein the instructions are executable to:

retract the seat belt at the first seat belt anchor point to simulate the user being forced to one side of a seat based on force simulated in the racing simulation.

9. The first device of claim 8, wherein the force comprises G-force and/or centripetal force simulated in the racing simulation.

10. The first device of claim 9, wherein the instructions are executable to:

as part of the racing simulation, control the electronic seat belt to tighten at plural seat belt anchor points on a same side of the user, the plural seat belt anchor points comprising the first seat belt anchor point.

11. The first device of claim 9, wherein the instructions are executable to:

as part of the racing simulation and to simulate centripetal force, control the electronic seat belt to tighten at plural seat belt anchor points on a first side of the user and control the electronic seat belt to loosen at plural seat belt anchor points on a second side of the user, the plural seat belt anchor points on the first side of the user comprising the first seat belt anchor point.

12. The first device of claim 1, wherein the instructions are further executable to:

as part of the racing simulation, control the electronic seat belt to loosen at the first seat belt anchor point by extending the seat belt at the first seat belt anchor point.

13. The first device of claim 1, wherein the instructions are executable to:

as part of the racing simulation and to simulate upward force, control the electronic seat belt to tighten at plural seat belt anchor points at an upper portion of the user and control the electronic seat belt to loosen at plural seat belt anchor points at a lower portion of the user.

14. The first device of claim 1, wherein the instructions are executable to:

as part of the racing simulation and to simulate vehicle acceleration, control the electronic seat belt to loosen all of plural seat belt anchor points.

15. The first device of claim 14, wherein all of the plural seat belt anchor points comprise five seat belt anchor points of a five-point seat belt.

16. The first device of claim 1, wherein the instructions are executable to:

as part of the racing simulation and to simulate vehicle deceleration, control the electronic seat belt to tighten all of plural seat belt anchor points.

17. The first device of claim 1, wherein the instructions are executable to:

as part of the racing simulation and to simulate traversal of terrain, control the electronic seat belt to tighten at the first seat belt anchor point.

18. The first device of claim 17, wherein the terrain comprises one or more of:

hills, valleys, and/or potholes.

19. A method, comprising:

facilitating a racing simulation at a device; and as part of facilitating the racing simulation, one or more of: providing one or more outputs related to the racing simulation based on biometric input associated with a user, providing force feedback at a steering wheel input device, controlling an output device to simulate wind, and/or controlling an electronic seat belt;

wherein the method comprises:

as part of facilitating the racing simulation, controlling an electronic seat belt to tighten at a first seat belt anchor point.

20. At least one computer readable storage medium (CRSM) that is not a transitory signal, the at least one CRSM comprising instructions executable by a processor assembly to:

facilitate a racing simulation; and as part of facilitating the racing simulation, one or more of: provide one or more outputs related to the racing simulation based on biometric input associated with a user, provide force feedback at a steering wheel input device, control an output device to simulate wind, and/or control an electronic seat belt;

wherein the instructions are executable to:

as part of facilitating the racing simulation, control an electronic seat belt to tighten at a first seat belt anchor point.

* * * * *